May 24, 1960  J. T. MAYNARD  2,938,131
LIQUID FILLED SUBMERSIBLE MOTOR
Filed July 15, 1957

INVENTOR.
JOHN T. MAYNARD
BY
*Andrus, Scales & Starke*
Attorneys

United States Patent Office 2,938,131
Patented May 24, 1960

2,938,131
LIQUID FILLED SUBMERSIBLE MOTOR

John T. Maynard, West Allis, Wis., assignor to A. O. Smith Corporation, Milwaukee, Wis., a corporation of New York Filed July 15, 1957, Ser. No. 671,875

9 Claims. (Cl. 310—87)

This invention relates to a liquid filled submersible motor and in particular to a motor having an equalizer member within the motor which compensates for volumetric changes of the liquid within the motor arising during motor operation.

Submersible motors are often constructed with a hermetically sealed stator chamber to prevent liquid from reaching the stator winding. This is necessary as a liquid would short the stator winding and destroy it.

The rotor in a submersible motor is such that it need not be protected from a liquid. Normally, however, the rotor chamber is sealed with a non-corrosive lubricating liquid such as oil, water or the like disposed therein to lubricate the motor bearings and to substantially prevent corrosion of the rotor and motor castings. The rotor chamber is then also sealed to prevent loss of this liquid.

In the alternative, the liquid within which the motor is submerged may be allowed to enter freely into the rotor chamber to cool and lubricate the bearings. However, when the motor is submerged in a well or the like, there is a danger of corrosion and entrance of abrasive particles into the rotor chamber. If abrasive particles should enter, they would tend to abrade the thrust and radial bearings.

The operation of submersible motors is normally intermittent and the liquid within the motor is alternately heated and cooled. When the liquid is heated, it tends to expand and in a sealed motor builds up a pressure within the rotor chamber. As shaft seals are not perfect, the liquid in the motor may force itself past the shaft seal and a certain amount of the liquid is discharged. When the motor stops and the liquid cools, it contracts and either lowers the level of the liquid within the motor or allows well liquid to enter to replace the discharged rotor liquid. If well liquid enters, the liquid may cause corrosion of the rotor and motor castings and deleterious foreign patricles may be carried in with the liquid. If the liquid level recedes below the level of the upper bearing, it may overheat and bind due to the loss of lubrication. To prevent the loss or discharge of rotor liquid, an equalizing expansion chamber may be provided within the rotor chamber. Opposed surfaces of the expansion chamber are contacted respectively by the rotor liquid and by the well liquid. The bag expands and contracts as the rotor liquid expands and contracts. The bag maintains a substantially zero pressure differential across the shaft seal and eliminates the interchange or loss of liquid past the seal.

Present constructions normally embody relatively large bags which are attached to the lower or the upper end of the motor. The present bags increase the overall length of the motor and also substantially add to the cost of construction of the motor. Further, the bags are not always entirely effective and it has been found that the rotor liquid may eventually be lost to such an extent that the complete collapse of the bag is insufficient to maintain the motor submersed in a lubricating liquid. The upper bearing then runs without lubrication and is rapidly destroyed.

In accordance with the present invention, an annular flexible member encircles one of the radial bearings. A suitable opening in the bearing housing subjects one surface of the sleeve to the well liquid and thus the sleeve constitutes an expansible member which moves and compensates for variations in the volume of the rotor liquid. A valved opening is provided which normally seals the rotor chamber. However, in the event a predetermined pressure drop is established within the rotor chamber, the valve opens and allows the rotor liquid to enter and thereby extends the life of the motor.

If the motor shaft projects out of the upper end of the motor, a plurality of lateral openings are provided in the upper radial bearing housing above the expansible sleeve. Consequently, if the sleeve expands and tightly seals to the stator structure to effectively seal off the upper portion of the rotor chamber, the lateral openings establish a leakage path for the incoming well liquid through the upper radial bearing from the upper portion to the lower portion of the rotor chamber. The lateral openings also tend to by-pass any rotor liquid which may be pumped upwardly by the rotation of the shaft.

The present invention provides a simple, low-cost pressure equalizing construction for a submersible motor including positive means to insure continuance of lubrication for the motor.

The drawings illustrate the best mode presently contemplated for carrying out the invention.

Figure 1:
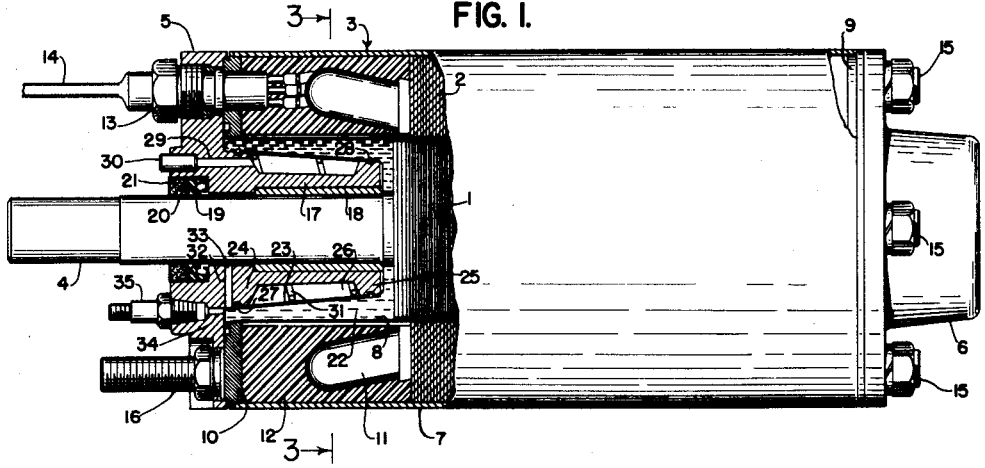
Figure 1 is an elevational view of a submersible motor with parts broken away and sectioned to show the details of the upper end of the motor.
Figure 2:
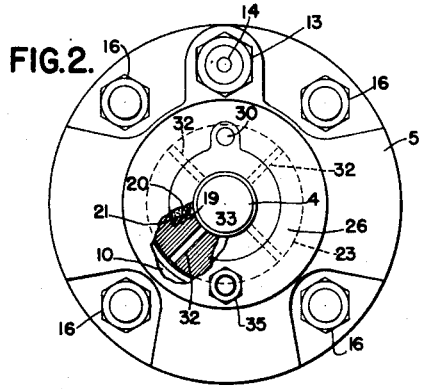
Fig. 2 is an upper end view of the motor.
Figure 3:
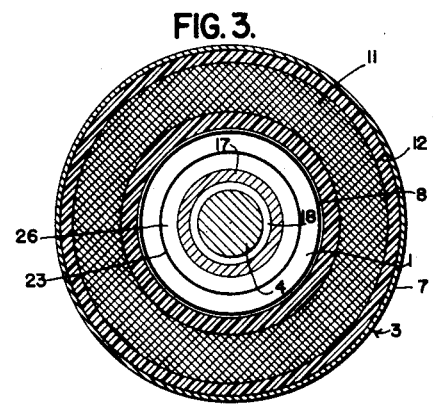
Fig. 3 is a cross-sectional view taken on line 3—3 of Fig. 1.

Referring particularly to Fig. 1 of the drawing, a submersible motor is shown which is adapted to be vertically disposed within a well, not shown, with the lower end of the motor shown to the right in Fig. 1. The motor comprises a rotor 1 rotatably supported within the bore of an annular stator core 2 which is supported within a hermetically sealed enclosure 3. A shaft 4 is secured to the rotor 1 and is journaled in an upper radial bearing housing and end closure 5 and a lower radial bearing housing and end closure 6 which are secured, respectively, to opposite ends of the stator enclosure 3.

The annular stator enclosure 3 includes an outer tubular frame 7 within which the stator core 2 is centrally secured. A thin metal sleeve 8 is concentrically disposed within the bore of the stator core 2 and extends axially coextensively with the frame 7. A lower end plate 9, shown to the right in Fig. 1, and an upper end plate 10, shown to the left in Fig. 1, are secured to the respective adjacent ends of tube 7 and liner 8 in axially spaced relation to the core 2 to provide a liquid-tight enclosure 3. Within the enclosure 3, a field winding 11 is disposed within a plurality of circumferentially spaced slots, not shown, in the core 2 and is extended axially from the core.

A plastic heat transfer material 12 fills the voids within the enclosure to carry away the heat generated by the energizing of the winding 11.

A power lead plug 13 is disposed within an opening in the upper end plate 10 to connect the winding 11 to a power line 14. By suitable energization of the winding 11, the rotor 1 is rotated to drive the shaft 4.

The lower bearing housing 6 is secured to the lower end plate 9 by a plurality of stud and bolt assemblies 15 and hermetically seals the lower end of the motor. The housing 6 supports a radial bearing assembly, not shown, and a thrust bearing assembly, not shown, to maintain alignment of the rotor 1 within the bore of the stator assembly 2.

The upper bearing housing 5 is secured to the upper stator end plate 10 by a plurality of stud and bolt assemblies 16. A central tubular hub 17 of the housing 5 extends inwardly toward the rotor 1 and terminates in slightly spaced relation thereto. The inner end of the bore of hub 17 is provided with a graphite liner 18 to provide an upper radial bearing and thereby maintain proper alignment of the shaft 4. The shaft 4 extends outwardly through the upper bearing housing 5 and is connected to drive a pump, not shown.

To seal the opening to the rotor chamber about the shaft 4, a rubber-like lip seal 19 and a felt seal 20 are secured in vertically cascaded relationship within a recess in the exterior surface of the housing 5. A brass cage 21 is disposed within the recess in the housing to maintain the seals 19 and 20 in place. The cascaded seals 19 and 20 establish a substantial seal which prevents liquid interchange along the shaft and thereby substantially confines a liquid 22 within the rotor chamber as defined by the liner 8 and the end bearing housings 5 and 6.

The liquid 22 is any suitable non corrosive lubricating liquid which is adapted to function under the temperature of the well liquid. For example, oil or a combination of water, anti-freeze, rust inhibitor, and a lubricant have been satisfactorily employed in a submersible motor.

Whenever the motor is operating, the heat generated thereby heats the rotor liquid 22 which then tends to expand. The pressure of the confined rotor liquid consequently increases. If the pressure increase is sufficiently great, the rotor liquid 22, in part, leaks from the rotor chamber past the cascaded shaft seals 19 and 20 which are insufficient to maintain the seal about the shaft of the increased pressure. When the motor ceases to operate and the liquid cools, the volume of the liquid 22 decreases and establishes a reduced pressure within the upper portion of the rotor chamber. The present invention provides an automatic volumetric change of the rotor chamber to allow the rotor liquid to expand and contract and thereby normally prevents the pressure from rising sufficiently to break the shaft seal.

A rubber-like sleeve 23 encircles the upper bearing hub 17 which is provided with an upper annular embossment 24 and a lower annular embossment 25 to define a recess intermediate the length of the sleeve and establish an annular chamber 26 between the hub 17 and the sleeve 23. An upper rubber O-ring 27 and a lower rubber O-ring 28 encircle the respective embossments 24 and 25 of the bearing hub 17 and tightly bind or clamp the sleeve to the hub to hermetically seal the chamber 26 from the rotor chamber. An axial passage 29 is provided in the bearing housing 5 to establish communication between the well liquid, not shown, and the chamber 26 and to allow the free interchange of liquid therebetween. A porous filter plug 30, of felt or other similar material, is secured within the axial passage 29. The plug 30 does not essentially interfere with the interchange of water but does prevent solid matter from entering into the chamber 26. This is necessary to prevent the chamber 26 from eventually being filled with solid matter.

When the motor winding 11 is energized and generates heat the temperature of the rotor liquid 22 increases and the liquid expands. The sleeve 23 collapses into the chamber 26 to compensate for the increase in the volume of the rotor liquid. When the winding 11 is de-energized, the rotor liquid 22 cools and contracts. Simultaneously, the sleeve 23 expands under the pressure of the well liquid until the pressure of the well liquid and the pressure in the rotor chamber become equal. Consequently, the pressure differential across the shaft seals 19 and 20 is maintained at substantially zero. This practically eliminates all tendency for the interchange of liquid past the shaft seal.

A spring 31 is disposed within the chamber 26 to preload the rubber sleeve 23 and maintains the rotor liquid 22 at a pressure greater than atmospheric to prevent collapse of the sleeve when filling the rotor chamber.

Although this construction compensates for all normal operations, in the event of abnormal motor operation, the rotor liquid 22 may be so heated and therefore expanded that the complete collapse of sleeve 23 does not compensate for the increase in volume of liquid 22. The cascaded seals 19 and 20 normally prevent leakage of the rotor liquid 22 until the pressure of the rotor liquid increases to a predetermined value. With time, the pressure at which leakage past the seal occurs decreases and eventually a very slight pressure differential causes leakage past the seal. Some of the rotor liquid 22 then escapes via the cascaded seals 19 and 20 and a decreased pressure is established within the rotor chamber when the motor stops. Further, the rotating shaft 4 inherently exerts a pumping action on the rotor liquid 22 and may tend to drive the rotor liquid out of the motor.

To compensate for the pumping action of the rotating shaft 4, the present invention employs four circumferentially spaced lateral passages 32 in the bearing housing immediately inwardly of the shaft seals 19 and 20. The passages 32 connect the rotor chamber with a running clearance 33 for the shaft 4 intermediate the bearing surface liner 18 and the adjacent seal 19.

If the rotor liquid 22 is pumped upwardly by the shaft 4, the liquid returns to the rotor chamber via the passages 32 and does not increase the pressure applied to the shaft seals.

In the event the rotor liquid is pumped out, either by the shaft 4 or by excessive heating and expansion of the rotor liquid 22, a pressure drop is created within the rotor chamber. The present embodiment of the invention allows the well liquid to enter before the upper bearing is damaged, as follows.

An axial passage 34 is provided in the upper bearing housing 5 and terminates adjacent the rotor chamber to establish liquid communication between the rotor chamber and the well liquid. The exterior end of the passage 34 is threaded to receive a valve 35 which normally closes the passage 34.

Figure 5:
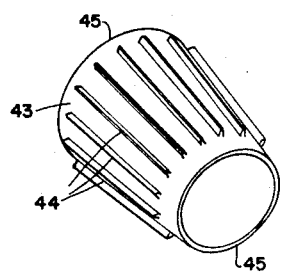
Fig. 5 is a perspective view of an alternative construction for the pressure equalizing member shown in Fig. 1.
Figure 4:
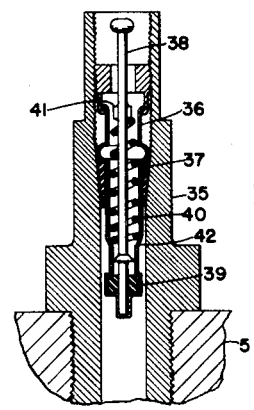
Fig. 4 is an enlarged fragmentary view of a portion of Fig. 1 to show the details of the valve.

The valve 35 is illustrated as the conventional relief valve, as shown most clearly in Fig. 5. A removable insert 36 is threaded into the housing of valve 35 and is provided with an exterior rubber bushing 37 hermetically sealing the insert 36 to the valve housing 35. A rod 38 extends through the insert 36 with a valve closure 39 secured to the inner end to seal the tubular insert. A coil spring 40 encircles the rod 38 and is restrained between a collar 41 on the rod 38 and a shoulder 42 on the interior surface of insert 36. The spring 40 biases the rod 38 outwardly through the upper end of the insert 36 to establish a hermetic junction between the closure 39 and the inner end of insert 36.

As long as the pressure of spring 40 plus the pressure of the liquid 22 in the rotor chamber is greater than the well liquid the valve closure 39 maintains valve 35 closed. However, if a pressure drop of a predetermined degree is created within the rotor chamber, the pressure of the well liquid 22 overcomes the spring pressure and moves member 38 and the attached closure 39 to open the valve. Well liquid then freely enters into the rotor chamber. Therefore, the rotor liquid 22 never recedes below the upper bearing and lubrication of the bearing liner 18 is maintained.

In the event the expansion sleeve 23 expands completely and engages the stator liner 8, the rotor chamber is divided. However, when the valve 35 opens, the well liquid enters the upper portion of the rotor chamber and seeps into the lower portion of the rotor chamber via the lateral passages 32 and the clearance along the radial bearing liner 18 and maintains lubrication of the bearing liner 18.

During the construction or assembly of the submersible motor, the axial passage 34 may be employed to fill the rotor chamber with the liquid 22.

Referring to Fig. 5 in the drawing, an expanding sleeve 43 is illustrated having a plurality of rigid, longitudinal V-shaped ribs 44. The ribs 44 may be formed in any suitable manner such as being integrally molded during the curing of the sleeve. The sleeve 43 is provided with annular end bands 45 which are sealed to the housing embossments 24 and 25, respectively.

If the sleeve expands completely and engages the liner 8 of the stator enclosure 3, the longitudinal ribs 44 establish a plurality of passages between adjacent ribs and the liner and thereby maintains communication between the upper and lower portions of the rotor chamber.

The annular sleeve member illustrated in the preferred embodiments of the invention may be replaced with a complete annular or donut-shaped bag or one or more portions thereof each of which is adapted to expand laterally in much the same manner as the illustrated sleeves. If an annular bag assembly is employed, it need only be attached at one position to the housing or the like.

The continuous recess and cooperating sleeve may be replaced with a partial recess in the bearing casting and a covering diaphragm which is subjected on opposite surfaces to the well liquid and the rotor liquid respectively.

Further, the expansion member can encircle, in whole or in part, the lower bearing assembly, not shown in detail, rather than the upper bearing assembly.

The present invention provides a simply and easily fabricated submersible motor of the pressure equalizing variety having a substantially reduced length over presently known constructions.

Various modes of carrying out the invention are contemplated as being within the scope of the following claims particularly pointing out and distinctly claiming the subject matter which is regarded as the invention.

I claim:

1. In a submersible motor having a rotor chamber adapted to be filled with a liquid and sealed to prevent escape of the liquid and having a tubular stator section with axially extending stator coils hermetically enclosed to form a sealed tubular member having end wall surfaces slightly spaced from the axial ends of the stator coils and defining the sidewall of the rotor chamber and having a radial sleeve bearing housing extended coaxially inwardly of the stator section, said extended housing being radially spaced from said stator section to establish an annular space in the motor, an annular flexible member disposed within said annular space and encircling the radial bearing housing within the motor and exposed on one surface to the rotor liquid, and passage means in communication with the chamber formed by the flexible member between the housing and the flexible member and with the well liquid to expose the opposite surface to the well liquid whereby the member flexes radially between the housing in the stator section to change the effective rotor volume and thereby compensates for volumetric changes in rotor liquid.

2. In a submersible motor having a rotor chamber adapted to be filled with a liquid and sealed to prevent escape of the liquid and having a radial bearing housing extended axially inwardly of the motor, a tubular resilient sleeve encircling said extended housing and being circumferentially sealed at axially spaced portions to the housing to establish a sealed annular encircling chamber between the housing surface and the inner surface of the sleeve, and a passage in said housing connecting said chamber and the surrounding well liquid whereby said sleeve expands and contracts within the rotor chamber to compensate for volumetric changes of rotor liquid under operating conditions and thereby maintains a relatively zero pressure differential across the shaft seal.

3. In a submersible motor having a rotor chamber adapted to be filled with a liquid and sealed to prevent escape of the liquid and having a radial bearing housing extended axially inwardly of the motor, said extended housing being radially spaced from a generally parallel longitudinal surface depending from one of the motor end closures to establish an annular space in the motor, said extended housing having an upper and a lower annular embossment, a tubular sleeve encircling said extended housing and being secured to the annular embossments at axially spaced circumferential portions of the sleeve to establish a variable volume-compensating chamber between the extended housing and the sleeve sealed from the rotor chamber, a passage connecting said chamber and the well liquid, and filter means in said passage to allow free flow of liquid into and out of the chamber and to prevent the flow of solid matter into the chamber.

4. In a liquid-filled submersible motor having an annular stator enclosure defining a rotor chamber and having an upper end closure secured to the upper end of stator enclosure with the motor shaft extending therethrough, a radial bearing housing hub integrally formed with the end closure and extending into the rotor chamber in radially spaced relation to the inner wall of the stator enclosure, an integral annular enlargement on said hub immediately adjacent the end closure, an integral annular enlargement on the axially inner end of said hub, a flexible sleeve encircling said hub and hermetically sealed at its upper end to the adjacent annular enlargement and at its lower end to the adjacent annular enlargement, a passage in said end closure and said upper enlargement permitting liquid communication between said chamber and the well liquid, and a porous plug in the outer end of the passage to prevent entrance of foreign matter into the chamber.

5. In a submersible motor adapted to be vertically lowered into a liquid beneath the pump and having a liquid filled rotor chamber and an upper shaft seal to prevent liquid interchange or escape of rotor liquid, a flexible sleeve member disposed within the rotor chamber encircling the upper radial bearing, means to hermetically seal the sleeve to axial spaced portion of the upper radial bearing, means to subject the inner surface of the sleeve to well liquid pressure, at least one transverse passage connecting the space between the shaft and radial bearing and the rotor chamber above said sleeve to return the rotor liquid pumped upwardly by the rotating shaft to the rotor chamber, a passage connecting the well liquid to the rotor chamber, and a relief valve disposed in said passage to normally close the passage and being responsive to a predetermined lower rotor chamber pressure relative to the well liquid pressure to open and admit well liquid to the upper portion of the rotor chamber if the flexible sleeve cannot compensate for the volumetric change of the rotor liquid during motor operation, said admitted well liquid passing through said transverse passage and downwardly along the upper radial bearing if the sleeve member is expanded to effectively seal the upper portion of the rotor chamber from the lower portion of the rotor chamber.

6. In a submersible motor having a liquid-filled rotor chamber and adapted to be vertically disposed in a well liquid with the motor shaft extending upwardly and adapted to be connected to a well pump and having a shaft seal to prevent entrance of liquid into the motor, a flexible tubular member encircling the upper radial motor bearing and being adapted to radially expand and contract to maintain a substantially zero pressure differential across said shaft seal, an upper passage adapted to allow the well liquid to enter the rotor chamber, a relief valve disposed in said passage and normally closing said passage, said valve opening to admit well liquid into the rotor chamber incident to an abnormal loss of rotor liquid greater than can be compensated for by said flexible member, and spacer means operatively associated with the annular member to prevent division of the rotor chamber by said flexible member.

7. In a submersible motor having a liquid-filled rotor chamber and adapted to be vertically disposed in a well liquid with the motor shaft extending upwardly and adapted to be connected to a well pump and having a shaft seal to prevent entrance of liquid into the motor, a flexible tubular member encircling the upper radial motor bearing and being adapted to radially expand and contract to maintain a substantially zero pressure differential across said shaft seal, an upper passage adapted to allow the well liquid to enter the rotor chamber, a relief valve disposed in said passage and normally closing said passage, said valve opening said passage and admitting well liquid into the rotor chamber incident to an abnormal loss of rotor liquid greater than can be compensated for by said flexible member, and a plurality of rigid axial corrugations on the outer peripheral surface of said tubular member to prevent establishment of a seal between the tubular member and the liner.

8. In a submersible motor having a rotor chamber adapted to be filled with a rotor liquid and sealed to prevent escape of the liquid and having a radial bearing housing extended axially inwardly of the motor into said rotor chamber, a volume compensating chamber at least partially encircling said bearing housing and having the surface of the bearing housing constituting a surface of the chamber and including a flexible member edge sealed to the housing to subject the outer surface to the pressure of the rotor liquid and to seal the surface from said rotor liquid, and passage means communicating with the chamber between the housing and the flexible member and with the well liquid to subject said opposite surface to the pressure of the well liquid to flex the member radially between the housing and change the effective rotor volume and thereby compensate for volumetric changes in rotor liquid.

9. In a submersible motor adapted to be vertically lowered into a liquid beneath the pump and having a liquid filled rotor chamber and an upper shaft seal to prevent liquid interchange or escape of rotor liquid, a flexible annular member disposed within the rotor chamber encircling the upper radial bearing, means to hermetically circumferentially seal the annular member to axial spaced portion of the upper radial bearing, means to subject the inner surface of the annular member to well liquid pressure, at least one transverse passage connecting the space between the shaft and radial bearing and the rotor chamber above said annular member to return the rotor liquid pumped upwardly by the rotating shaft to the rotor chamber, a passage connecting the well liquid to the rotor chamber, and a relief valve disposed in said passage to normally close the passage and being responsive to a predetermined lower rotor chamber pressure relative to the well liquid pressure to open and admit well liquid to the upper portion of the rotor chamber if the flexible annular member cannot compensate for the volumetric change of the rotor liquid during motor operation, said admitted well liquid passing through said transverse passage and downwardly along the upper radial bearing if the annular member is expanded to effectively seal the upper portion of the rotor chamber from the lower portion of the rotor chamber.

References Cited in the file of this patent
UNITED STATES PATENTS

| | | |
|---|---|---|
| 2,002,907 | Sessions | May 28, 1935 |
| 2,194,561 | Mason | Mar. 26, 1940 |
| 2,783,400 | Arutunoff | Feb. 26, 1957 |

FOREIGN PATENTS

| | | |
|---|---|---|
| 525,507 | Canada | May 29, 1956 |